United States Patent
Srivastava et al.

(10) Patent No.: US 8,407,255 B1
(45) Date of Patent: Mar. 26, 2013

(54) METHOD AND APPARATUS FOR EXPLOITING MASTER-DETAIL DATA RELATIONSHIPS TO ENHANCE SEARCHING OPERATIONS

(75) Inventors: Sharad Srivastava, New Delhi (IN); Vikas Sagar, Faridabad (IN)

(73) Assignee: Adobe Systems Incorporated, San Jose, CA (US)

( * ) Notice: Subject to any disclaimer, the term of this patent is extended or adjusted under 35 U.S.C. 154(b) by 95 days.

(21) Appl. No.: 13/107,083

(22) Filed: May 13, 2011

(51) Int. Cl.
*G06F 17/30* (2006.01)
(52) U.S. Cl. ........ 707/791; 707/802; 707/814; 707/822; 707/828
(58) Field of Classification Search ........... 707/600–899
See application file for complete search history.

(56) References Cited

U.S. PATENT DOCUMENTS

| | | | |
|---|---|---|---|
| 2006/0026147 A1* | 2/2006 | Cone et al. | 707/3 |
| 2008/0071732 A1 | 3/2008 | Koll | |
| 2009/0287696 A1 | 11/2009 | Galuten | |
| 2010/0205141 A1 | 8/2010 | Meesa | |

* cited by examiner

*Primary Examiner* — Isaac M Woo
(74) *Attorney, Agent, or Firm* — Moser Taboada

(57) ABSTRACT

A method and apparatus for exploiting a master-detail relationship between a first structured data and at least one second structured data to enhance searching operations of a database containing the first data structure and the at least one second data structure, comprising accessing a first structured data and at least one second structured data of the database; and in response to orthogonal data filter characteristics, augmenting the first structured data with information related to the at least one second structured data to enhance searching of the database.

20 Claims, 6 Drawing Sheets

METHOD AND APPARATUS FOR EXPLOITING MASTER-DETAIL DATA RELATIONSHIPS TO ENHANCE SEARCHING OPERATIONS

BACKGROUND

1. Technical Field

Embodiments of the present application generally relate to database management systems and, in particular, to a method and apparatus for exploiting master-detail relationships of structured data to enhance searching operations.

2. Description of the Related Art

In a typical computing system, an organization may employ a number of technologies to process, store, protect, recover, produce and secure mission critical data. The typical computing system may include one or more data storage systems for facilitating permanent storage, retrieval and transmission of mission critical data throughout a computer network. For example, the typical computing environment may include one or more database management systems for organizing and retrieving structured data records (e.g., tables) from one or more databases.

A type of normalized data model used by a database management system includes several master-detail relationships among a plurality of structured data tables. While a master-detail relationship is essential for accurately representing one-to-many database relationships, such data models pose unique problems when performing searching operations (e.g., a series of database read operations). The search operation normally starts from a detail table and then, performs a join process to link and/or combine with a master table. If the data contained in the master table and detail table is too large, the join process causes performance issues. Furthermore, the complexity increases and performance suffers if more than one detail table is involved in a single searching operation.

Furthermore, when joining across multiple detail tables, current database management software applications are prone to forming an incorrect join order or using an incorrect joining function, such as using a hash join when a nested loop join is required. Such errors result in erroneous search results and/or inefficient search processes.

Therefore, there is a need in the art for a method and apparatus for exploiting a master-detail relationship of structured data to enhance searching operations.

SUMMARY

Various embodiments of the present application generally comprise a method and apparatus for exploiting a master-detail relationship between a first structured data and at least one second structured data to enhance searching operations of a database containing the first data structure and the at least one second data structure. The method comprises accessing the first structured data and at least one second structured data of the database and, in response to orthogonal data filter characteristics, augmenting the first structured data with information related to the at least one second structured data to enhance searching of the database.

Figure 1:
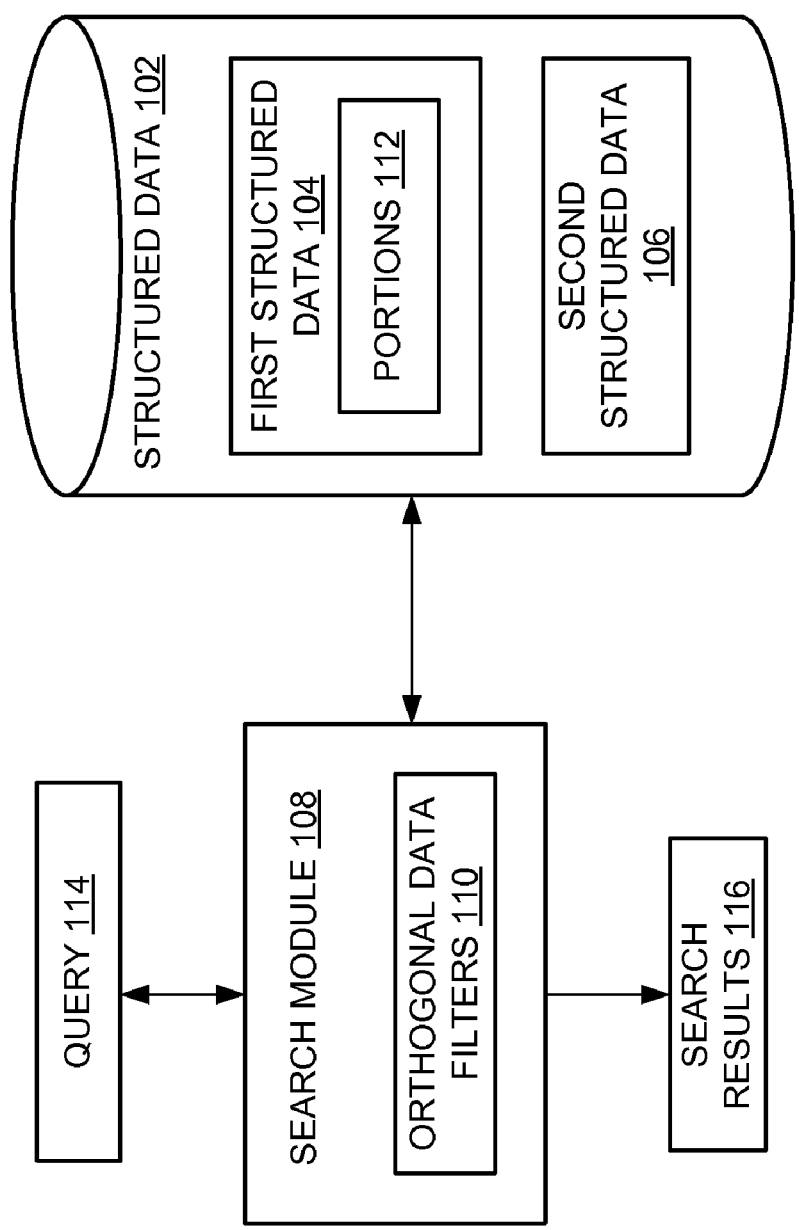
FIG. 1 is a functional block diagram illustrating an apparatus for exploiting master-detail data relationships of structured data to enhance searching operations according to various embodiments.

While the method and apparatus for modifying structured data to enhance searching operations is described herein by way of example for several embodiments and illustrative drawings, those skilled in the art will recognize that the method and apparatus for modifying structured data to enhance searching operations is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for exploiting master-detail relationships of structured data to enhance searching operations are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention exploit master-detail data relationships of data structures to enhance searching capabilities. In one embodiment, a master table data is modified or otherwise augmented to include information to support use of a plurality of orthogonal filters during searching. The orthogonal filters extract information from the master table that would otherwise require direct searching in related detail tables. Using the orthogonal filters on a modified master table, improves the speed and accuracy of searching by limiting the need to extensively search detail tables.

FIG. 1 is a functional block diagram illustrating an apparatus 100 for exploiting a master-detail relationship of structured data to enhance searching operations according to various embodiments. The apparatus 100 includes structured data 102, which may be organized as data tables in a database. The structured data 102 includes first structured data 104 and second structured data 106. As explained further below, the first structured data 104 bear a logical relationship with the second structured data 106. For example, the first structured data 104 may include a master table that corresponds with at least one detail table stored in the second structured data 106. It is appreciated that one detail table or a plurality of detail tables may correspond with the master table. Accordingly, the structured data 102 may include a plurality of the second structured data. Consequently, first structured data 104 and second structured data 106 have a master-detail relationship.

In some embodiments, the apparatus 100 includes a search module 108 comprising processor-executable instructions in the form of software, firmware and/or hardware (i.e., embedded in a physical device). The search module 108 includes orthogonal data filters 110, which define information (portions 112) to be added to or modified within the first structured data to facilitate exploitation of the master-detail relationship. By exploiting the master-detail relationship, the search module 108 executes a query 114 invoking the use of the orthogonal filters 110 and produces search results 116 that are accurate and deterministic.

Figure 2:
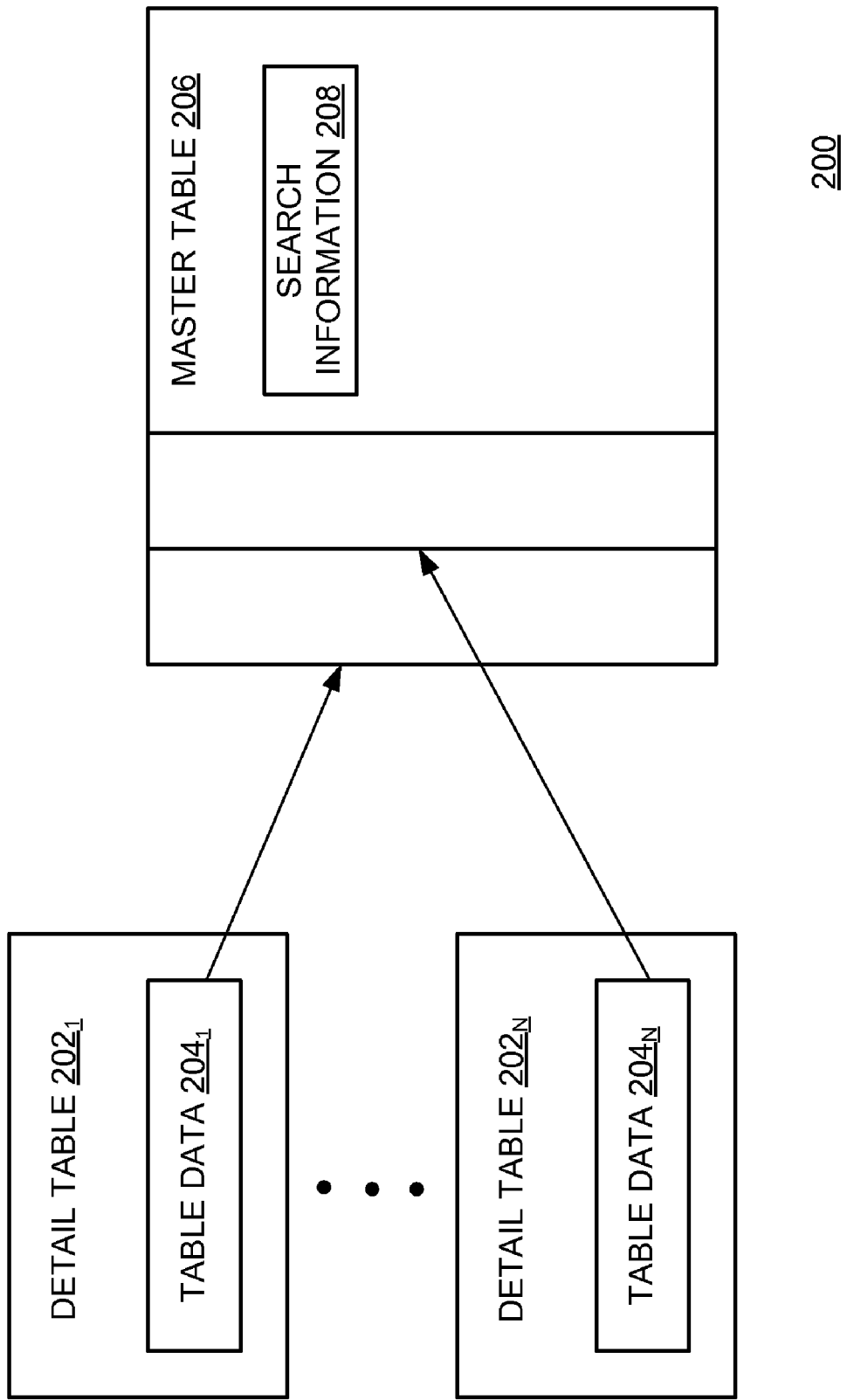
FIG. 2 illustrates a master-detail relationship between structured data as operated upon by the apparatus of FIG. 1.

Inaccurate and computationally expensive search results for queries can be improved or avoided if the searching operations are driven from the first structured data 104 (e.g., master table) instead of the second structured data 106 (e.g., detail table). This would have the advantage that the data is being searched in a smaller table with no redundancy due to duplicate rows and a smaller set of structured data. FIG. 2 illustrates a master-detail relationship 200 between structured data according to various embodiments. In some embodiments, the master detail relationship 200 exists between detail tables 202 and a master table 206. FIG. 2 highlights the inverted searching operation of embodiments of the present invention where searching is driven from the master table 206 instead of the detail tables 202 using two or more statistical search procedures (e.g., applying data filters).

Essential table data 204 within the detail tables 202 is represented in the master table 206 as search information 208 for which effective searching is now enabled without a need to join one or more detail tables during an initial search. In some embodiments, once a master table search is complete, the relevant detail table(s) can be joined to confirm the results, as needed. Such an augmentation is designed to facilitate using various mathematical functions referred to as a data filters, such as a first data filter and a second data filter. The search information may be additional information representing data in the detail table(s), modifying existing master table information, or reorganized master table information. This search information 208 is specifically designed to operate with the data filters to exploit the master-detail relationship.

In some embodiments, the data filters have filter characteristics such that the first data filter is orthogonal to the second data filter. Orthogonality, for example, between two data filters implies that a best case for the first data filter is a worst case for the second data filter and vice-versa.

For example, a master table 206 may contain information regarding test cases (refer to this master table as TestCase). Each row of TestCase may contain information related to each individual test case and a link to supporting data within one or more detail tables 202. For example, each detail table may contain a list of users (by user ID) that participated in an associated test case.

To facilitate searching in TestCase for user participation information without exhaustively searching all the detail tables, the filter characteristics of a pair or orthogonal filters are used to define search information 208 to be added to the master table 206 as well as to be used to extract search results.

One exemplary filter searches for the existence of user IDs within a span of ID values. To facilitate use of this filter, the search information 208 contains a list of all ID values. Such a filter operation, when applied to a list, is designed to identify user IDs that are grouped (or near each other) within the span:

$$\text{MinimumUserID} \leq \text{user ID} \leq \text{MaximumUserID}.$$

Thus, an orthogonal filter would find user IDs that are not grouped (or spread from each other). Such a filter can be designed for such as task and search information can be added to the master table to facilitate such a search.

For example, all the user IDs may be listed numerically and subdivided into groups of "n" User IDs. If n is 100 and there are 2000 User IDs, then 20 groups are formed. Each group is then assigned a prime number as follows:

| Group | Number |
|---|---|
| Group 1 (1-100) | 2 |
| Group 2 (101-200) | 3 |
| Group 3 (201-300) | 5 |
| . | . |
| . | . |
| . | . |
| Group 20 (1901-2000) | 71 |

If a participant in Group 1 is associated with testcase 1 and a participant in Group 3 is also associated with testcase 1, then the testcase 1 information is augmented with a prime product value "10" (e.g., added to the row as a new column) in the master table 206 as search information 208. If, as a further example, testcase 2 has participants from Groups 1, 3 and 20, the prime product value is "710". Each test case in TestCase is augmented with this form of information.

The second filter when applied to the search information 208 identifies user IDs related to a test case where the user ID numbers are distant from each other, e.g., separated by one or more disparate groups. Thus, if a test case involving users in group 3 are to be found, the filter extracts all test cases having a prime product value that is divisible by five.

Using the first and second orthogonal filters on the search information of the master table rapidly extracts a subset of test cases that meets the search criteria. To further narrow the results and confirm accuracy, the specific detail tables associated with the search results gleaned from the master table are joined. Since only a limited number of detail tables will be joined, the search is completed quickly. Furthermore, since a limited number of detail tables would be joined, the risk of a joining error is reduced.

Alternatively, a variation of the second data filter can assign numbers according to a deterministic system similar UNIX file permissions where a single number effectively represents all the underlying file permissions. The second data filter assigns a single number to each set of groups that include a certain employee.

Figure 3:
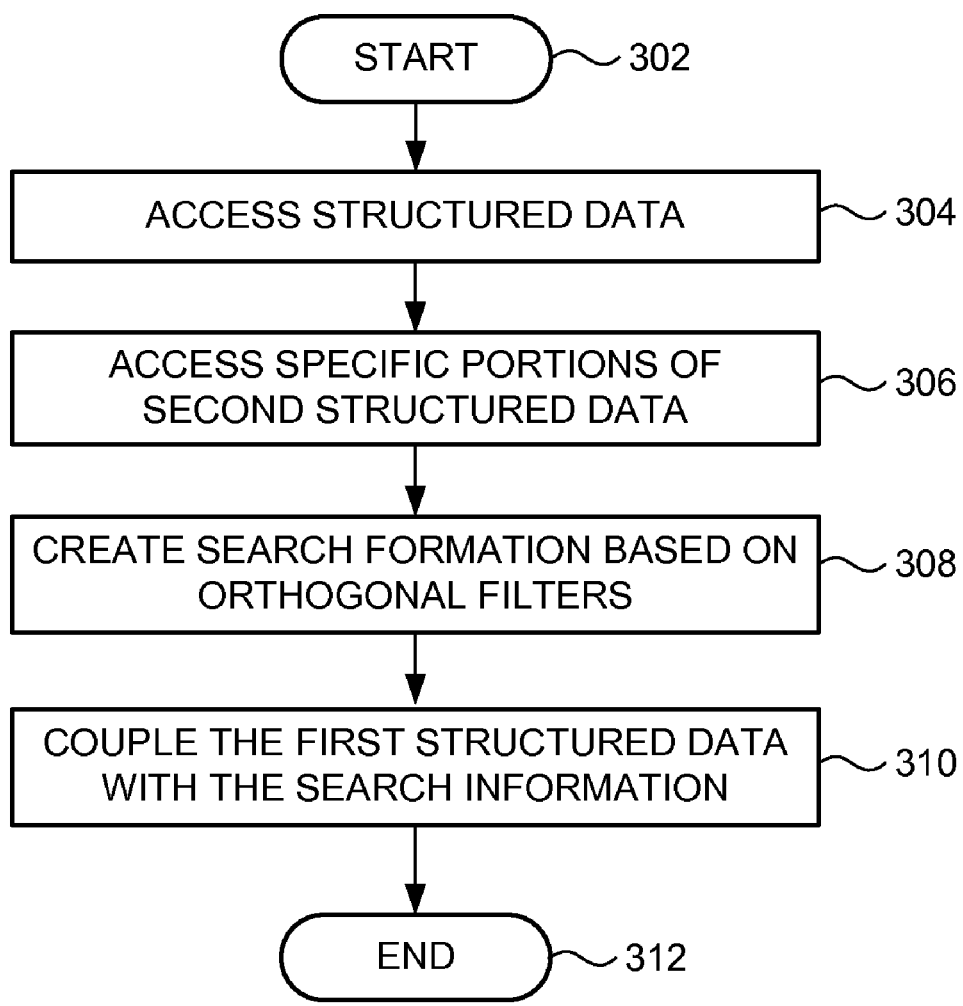
FIG. 3 is a flow diagram of a method of modifying structured data to enhance searching operations as performed by the search module of FIG. 1 according to various embodiments.

FIG. 3 is a flow diagram of a method of modifying (or otherwise augmenting) structured data to enhance searching operations according to various embodiments. At step 304, the method 300 accesses structured data. At step 306, the method 300 accesses portions of second structured data in view of the filter characteristics of the orthogonal filters to be used for searching. At step 308, the method 300 creates the search information based on the orthogonal filters. At step 310, the method 300 couples the first structured data to the search information (i.e., the first data structure is augmented with the search information). The method 300 ends at step 312. At this point, the master table has been modified to include search information to be used when applying the orthogonal filters during searching the database.

Figure 6:
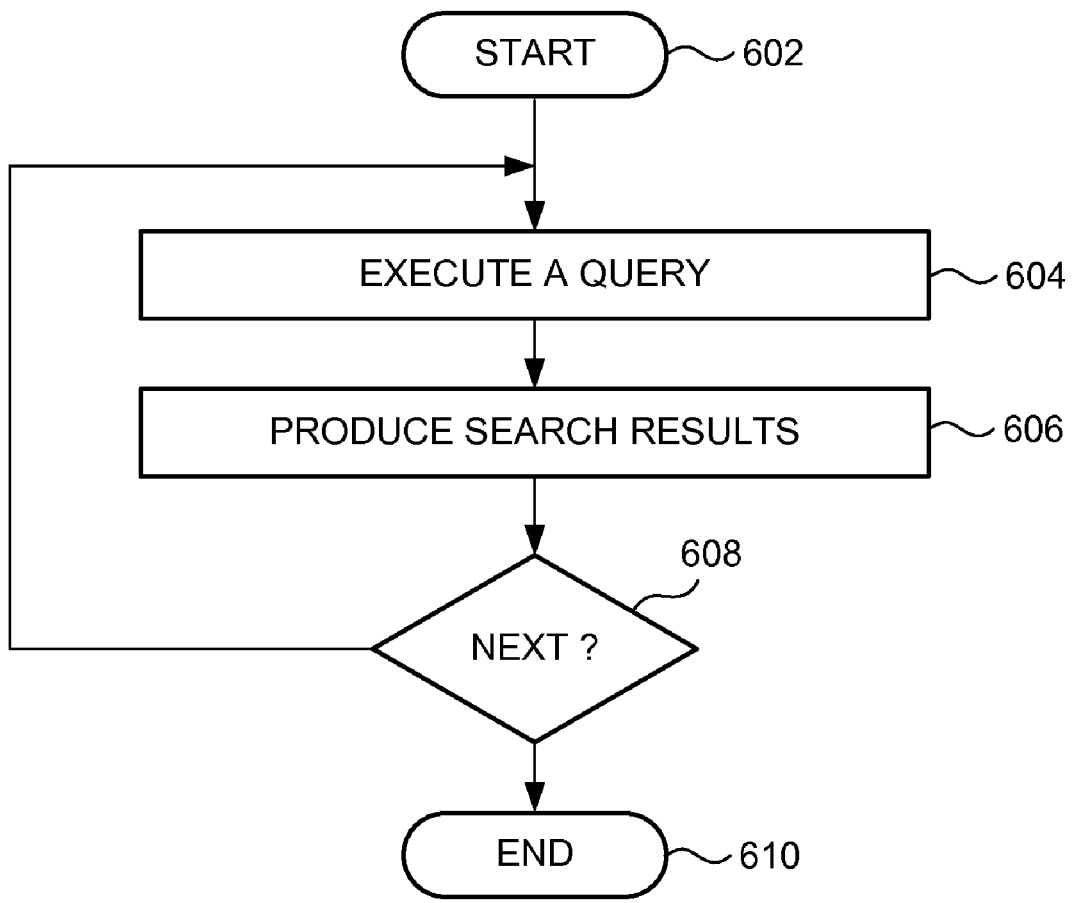
FIG. 6 is a flow diagram for searching a database using the search module of FIG. 1 according to one or more embodiments.

FIG. 6 depicts a flow diagram of a method 600 for executing queries for searching using embodiments of the invention to exploit a master-detail relationship of data structures. The method 600 begins at step 602 and proceeds to step 604. At step 604, the method 600 executes a query. The query accesses and applies the appropriate orthogonal filters to the first structured data and its search information. As needed, the search results of the search in the first structured data may be used to guide a search in the second structured data (e.g., a limited amount of second structured data is searched as needed to confirm the results from the first structured data). At step 606, the method 600 produces search results. At step 608, the method 600 determines whether there is a next query. If there is a next query, the method 600 proceeds to step 610. If on the other hand, there are no more queries, the method 600 returns to step 604.

Figure 4:
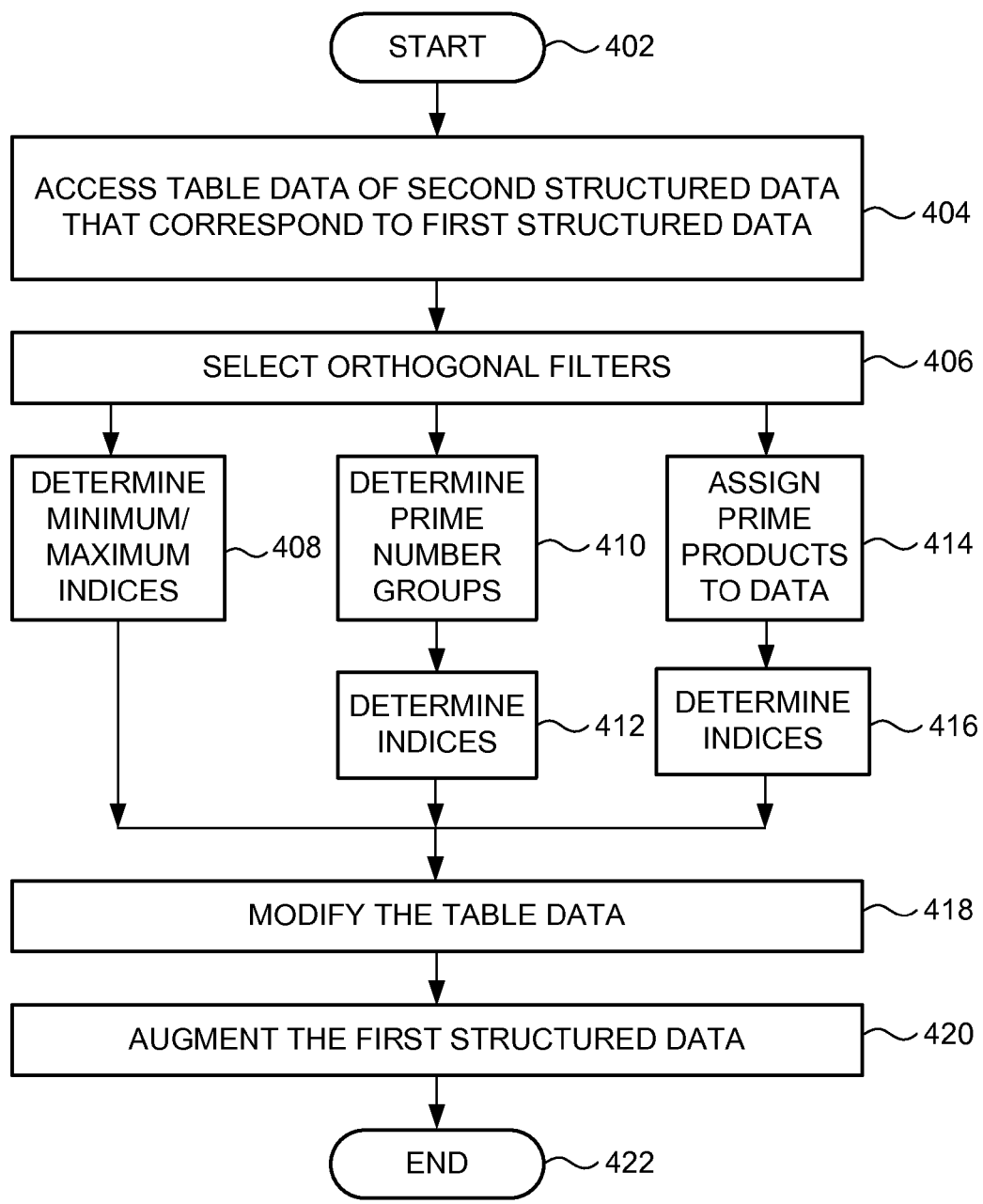
FIG. 4 is a flow diagram of a method of coupling first structured data with portions of at least one second structured data as performed by the search module of FIG. 1 according to various embodiments.

FIG. 4 is a flow diagram of a method 400 of augmenting first structured data with search information related to at least one second structured data according to various embodiments. In some embodiments, each and every step of the method 400 is performed by a search module (e.g., the search module 108 of FIG. 1). In other embodiments, one or more steps are skipped or omitted. The method 400 starts at step 402 and proceeds to step 404.

At step 404, the method 400 accesses table data of second structured data that correspond to first structured data. At step 406, the method 400 selects orthogonal filters that will be used to search the first structured data. At step 408, the method 400 determines minimum/maximum indices. The method 400 stores minimum and maximum indices (e.g., user_ids) for portions of the at least one second structured data that correspond with the first structured data. As described above, such indexing can be used while searching. For example, a query that can be used is minimum_user_id<=user_id<=maximum_user_Id. Such a data filter will give exact result for single user, reasonable results for multiple employees that lie close to each other in the first structured data and give poor search results if the users are separated by several entries in the user list.

At step 410, the method 400 determines prime number groups. At step 412, the method 400 determines indices (e.g., assigns prime numbers to groups of users). At step 414, method 400 assigns prime products to structured data. At step 416, the method 400 computes indices (e.g., associates prime product values with first structured data). At step 418, method 400 modifies the table data to add search information. At step 420, method 400 augments the first structured data with the search information. At step 422, method 400 ends.

Figure 5:
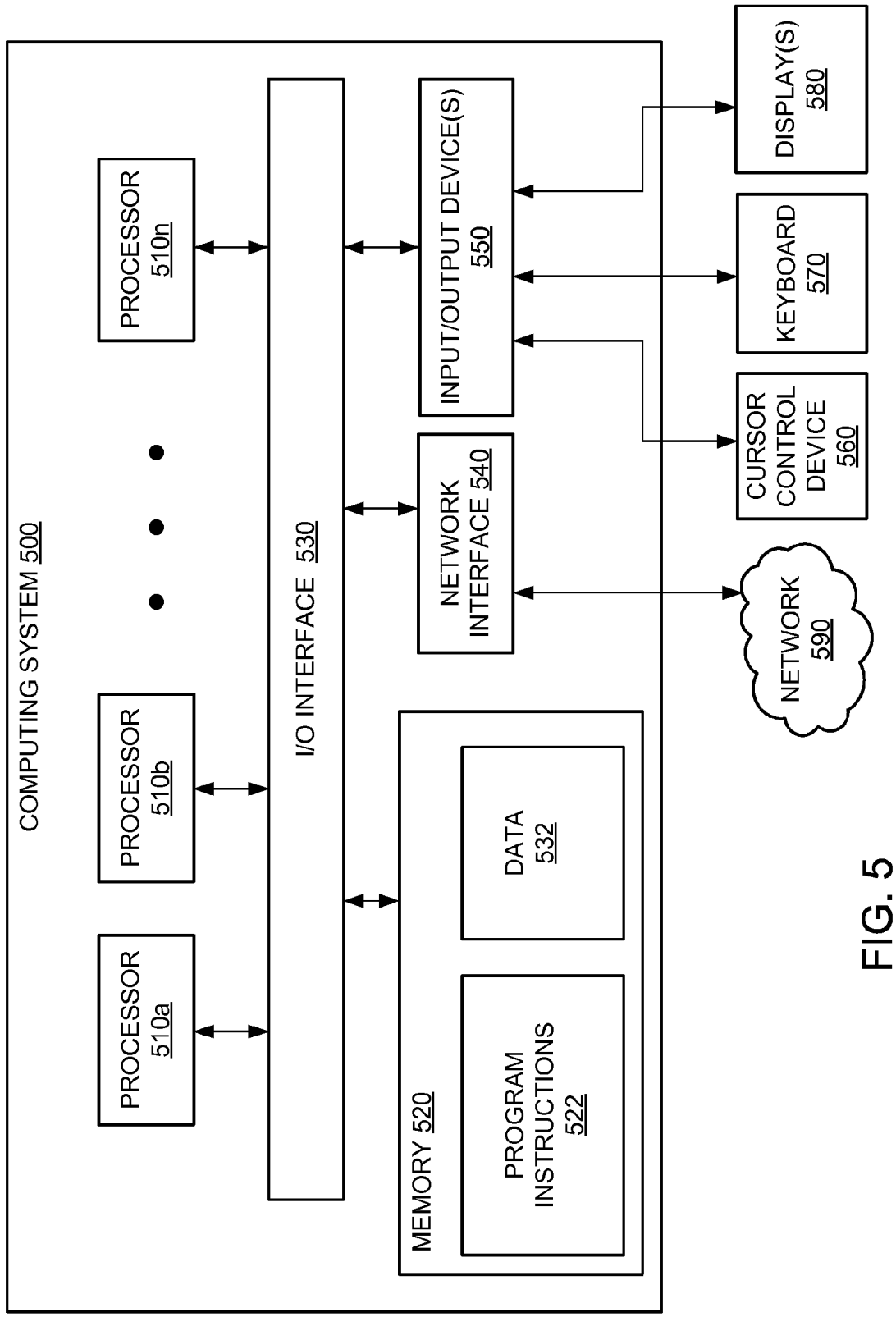
FIG. 5 is a schematic diagram of a computing system to implement the functional blocks of FIG. 1 for exploiting master-detail data relationships of structured data to enhance searching operations according to one or more embodiments.

FIG. 5 is a schematic diagram of a computing system that can be used as a computer for exploiting the master-detail relationship of structured data to enhance searching operations according to one or more embodiments. At step 510, the computing system 500 accesses the processor. At step 530, computing system 500 accesses the i/o interface. At step 520, computing system 500 accesses memory. At step 522, computing system 500 accesses program instructions. At step 523, computing system 500 accesses data. At step 540, computing system 500 accesses network interface. At step 550, computing system 500 accesses I/O device(s). At step 590, computing system 500 accesses the network. At step 560, computing system 500 accesses a cursor control device. At step 570, computing system 500 accesses a keyboard. At step 580, computing system 500 displays information.

Example Computer System

Various embodiments of a method and apparatus for modifying structured data to enhance searching operations, as described herein, may be executed on one or more computer systems, which may interact with various other devices. One such computer system is computer system 500 illustrated by FIG. 5, which may in various embodiments implement any of the elements or functionality illustrated in FIGS. 1-4 and 6. In various embodiments, computer system 500 may be configured to implement the search module 108 described above. While the illustrated system demonstrates computer system 500 implementing the search module 108, computer system 500 may be used to implement any other system, device, element, functionality or method of the above-described embodiments. In the illustrated embodiments, computer system 500 may be configured to implement the search module 108 as processor-executable executable program instructions 522 (e.g., program instructions executable by processor(s) 510) in various embodiments.

In the illustrated embodiment, computer system 500 includes one or more processors 500 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components 550 may be utilized by the computer system 500 to receive user input in the form of a query as described above.

In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 520 and/or data 532 accessible by processor 510. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 530, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIGS. 3-4 and 6. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for exploiting a master-detail relationship between a first structured data and at least one second structured data to enhance searching operations of a database containing the first data structure and the at least one second data structure, comprising:

accessing a first structured data and at least one second structured data of the database, wherein the first structured data and the at least one second structured data have a master-detail relationship; and in response to orthogonal data filter characteristics, augmenting the first structured data with information related to the at least one second structured data to enhance searching of the database.

2. The method of claim 1 further comprising executing a query that applies orthogonal data filters having the orthogonal data filter characteristics to the first structured data to produce search results.

3. The method of claim 2, wherein, while executing the query, the first structured data is not joined with the at least one second data structure.

4. The method of claim 2, wherein the orthogonal data filters comprise at least two data filters, wherein a first data filter and a second data filter are applied to the first structured data.

5. The method of claim 1, wherein the first structured data comprises a master data table and the at least one second structured data comprises at least one detail data table.

6. The method of claim 1, wherein augmenting further comprises selecting the orthogonal filters to apply to the database during a subsequent search of the database.

7. The method of claim 1, wherein the information is derived from content of the at least one second structured data.

8. An apparatus for exploiting a master-detail relationship between a first structured data and at least one second structured data to enhance searching operations of a database containing the first data structure and the at least one second data structure, comprising:

a search module for accessing a first structured data and at least one second structured data of the database, wherein the first structured data and the at least one second structured data have a master-detail relationship; and in response to orthogonal data filter characteristics, for augmenting the first structured data with information related to the at least one second structured data to enhance searching of the database.

9. The apparatus of claim 8 further comprising orthogonal data filters having the orthogonal data filter characteristics that are applied to the first structured data to produce search results.

10. The apparatus of claim 9, wherein the first structured data is not joined with the at least one second data structure.

11. The apparatus of claim 9, wherein the orthogonal data filters comprise at least two data filters, wherein a first data filter and a second data filter are applied to the first structured data.

12. The apparatus of claim 8, wherein the first structured data comprises a master data table and the at least one second structured data comprises at least one detail data table.

13. The apparatus of claim 8, wherein augmenting further comprises selecting the orthogonal filters to apply to the database during a subsequent search of the database.

14. A computer readable medium for storing processor executable instructions that, when executed by a computing system, causes the computing system to perform a method for exploiting a master-detail relationship between a first structured data and at least one second structured data to enhance searching operations of a database containing the first data structure and the at least one second data structure, comprising:

accessing a first structured data and at least one second structured data of the database, wherein the first structured data and the at least one second structured data have a master-detail relationship; and in response to orthogonal data filter characteristics, augmenting the first structured data with information related to the at least one second structured data to enhance searching of the database.

15. The computer readable medium of claim 14 further comprising executing a query that applies orthogonal data filters having the orthogonal data filter characteristics to the first structured data to produce search results.

16. The computer readable medium of claim 15, wherein, while executing the query, the first structured data is not joined with the at least one second data structure.

17. The computer readable medium of claim 15, wherein the orthogonal data filters comprise at least two data filters, wherein a first data filter and a second data filter are applied to the first structured data.

18. The computer readable medium of claim 14, wherein the first structured data comprises a master data table and the at least one second structured data comprises at least one detail data table.

19. The computer readable medium of claim 14, wherein augmenting further comprises selecting the orthogonal filters to apply to the database during a subsequent search of the database.

20. The computer readable medium of claim 14, wherein the information is derived from content of the at least one second structured data.

* * * * *